United States Patent
Sugisawa

(10) Patent No.: US 6,504,475 B2
(45) Date of Patent: Jan. 7, 2003

(54) APPARATUS AND METHOD FOR ALARMING DECREASE IN TIRE AIR-PRESSURE

(75) Inventor: Toshifumi Sugisawa, Kobe (JP)

(73) Assignees: Sumitomo Rubber Industries, Ltd., Hyogo-ken (JP); Sumitomo Electric Industries, Ltd., Osaka-fu (JP)

( * ) Notice: Subject to any disclaimer, the term of this patent is extended or adjusted under 35 U.S.C. 154(b) by 0 days.

(21) Appl. No.: 09/955,937

(22) Filed: Sep. 20, 2001

(65) Prior Publication Data

US 2002/0057196 A1 May 16, 2002

(30) Foreign Application Priority Data

Sep. 20, 2000 (JP) ........................................ 2000-285420

(51) Int. Cl.⁷ ............................................... B60C 23/00
(52) U.S. Cl. ...................... 340/444; 340/442; 340/443; 340/441; 340/445; 701/39; 701/38; 701/65; 73/146.1; 73/146.2; 73/146.5
(58) Field of Search ................................ 340/444, 442, 340/441, 443, 445; 701/39, 65, 38; 73/146.1, 146.2, 146.5

(56) References Cited

U.S. PATENT DOCUMENTS 5,591,906 A * 1/1997 Okawa et al. ............. 73/146.5
5,753,809 A * 5/1998 Ogusu et al. ............... 73/146.2
6,092,028 A * 7/2000 Naito et al. .................... 702/47

* cited by examiner

Primary Examiner—Daniel J. Wu
Assistant Examiner—Tai T. Nguyen
(74) Attorney, Agent, or Firm—Birch, Stewart, Kolasch & Birch, LLP

(57) ABSTRACT

An apparatus for alarming decrease in tire air-pressure which detects the decrease in internal pressure of the tire based on wheel speed information obtained from wheels of a vehicle and accordingly alarms a driver. The apparatus comprises: a wheel speed information detecting means, a memory means for storing the wheel speed information of the respective tires, a calculating means for calculating a judged value based on a vehicle velocity and wheel speed information, and a judging means for determining a decrease in tire air-pressure based on correlation of the vehicle velocity and an outer diameter of the tire at the time of performing high-speed running. It is possible to determine a decompression of a tire based on the correlation also in case the judged value will not become large owing to increased influence of centrifugal force during high-speed running even though a tire is in a decompressed condition.

6 Claims, 2 Drawing Sheets

APPARATUS AND METHOD FOR ALARMING DECREASE IN TIRE AIR-PRESSURE

BACKGROUND OF THE INVENTION

The present invention relates to an apparatus and a method for alarming decrease in tire air-pressure. More particularly, it relates to an apparatus and a method for alarming decrease in tire air-pressure which is capable of detecting decompression of a tire even when performing high speed running with tires such as fuel-sparing tires which are soft and highly flat.

It is conventionally known for a system for alarming decrease in tire air-pressure (DWS) for detecting decompression of a tire based on rotational (wheel speed) information of four wheels. Such a system is based on the theory that a rotational velocity or rotational angular velocity of a decompressed tire is increased compared to other normal tires since its outer diameter (dynamic load radius of the tire) is decreased in contrast to tires of normal internal pressure. In a method for detecting decrease in internal pressure on the basis of a relative difference of rotational angular velocities of tires (refer to Japanese Unexamined Patent Publication No. 305011/1988), a judged value DEL is defined as follows:

$$DEL=\{(F1+F4)/2-(F2+F3)/2\}/\{(F1+F2+F3+F4)/4\}\times 100(\%)$$

Here, F1 to F4 indicate rotational angular velocities of a front left tire, a front right tire, a rear left tire and a rear right tire, respectively.

Upon calculation of this DEL value, required correction such as cornering correction or reject of unnecessary data is performed, and it is determined that decompression of a tire has occurred in case the obtained value exceeds a preliminarily set threshold.

However, since centrifugal force acts on tires during running, tires are apt to be deflected outwardly. It might thus happen in conventional methods that a deflated tire cannot be detected since a tire diameter does not vary to a large extent owing to the effect of centrifugal force even though the tire is actually decompressed.

Such cases in which deflation of a tire cannot be detected might increasingly happen when performing high-speed running at approximately 150 km/h using tires of fuel-sparing design. Such tires of fuel-sparing design are of soft and highly flat structure and are especially apt to deflect outwardly since lockup force with respect to centrifugal force will be further weakened in case the internal pressure is decreased. With this reason, deflation can hardly be detected with a conventional apparatus for alarming decrease in tire air-pressure when performing high-speed running at approximately 150 km/h with such tires of fuel-sparing design.

The present invention has been made in view of the above facts, and it is an object thereof to provide an apparatus and a method for alarming decrease in tire air-pressure with which it is possible to detect decompression of a tire also when the vehicle is performing high-speed running.

SUMMARY OF THE INVENTION

In accordance with the present invention, there is provided an apparatus for alarming decrease in tire air-pressure which detects the decrease in internal pressure of the tire based on wheel speed information obtained from wheels of a vehicle and accordingly alarms a driver, comprising: a wheel speed information detecting means for detecting wheel speed information of the respective tires, a memory means for storing the wheel speed information of the respective tires, a calculating means for calculating a judged value based on a vehicle velocity and wheel speed information of the respective tires, and a judging means for determining a decrease in tire air-pressure based on correlation of the vehicle velocity and an outer diameter of the tire at the time of performing high-speed running.

In accordance with the present invention, there is also provided a method for alarming decrease in tire air-pressure which detects the decrease in internal pressure of the tire based on wheel speed information obtained from wheels of a vehicle and accordingly alarms a driver, comprising the steps of: detecting wheel speed information of the respective tires, storing the wheel speed information of the respective tires, calculating a judged value based on a vehicle velocity and wheel speed information of the respective tires, and determining a decrease in tire air-pressure based on correlation of the vehicle velocity and an outer diameter of the tire at the time of performing high-speed running.

DETAILED DESCRIPTION

The apparatus and method for alarming decrease in tire air-pressure according to the present invention will now be explained based on the accompanying drawings.

Figure 1:
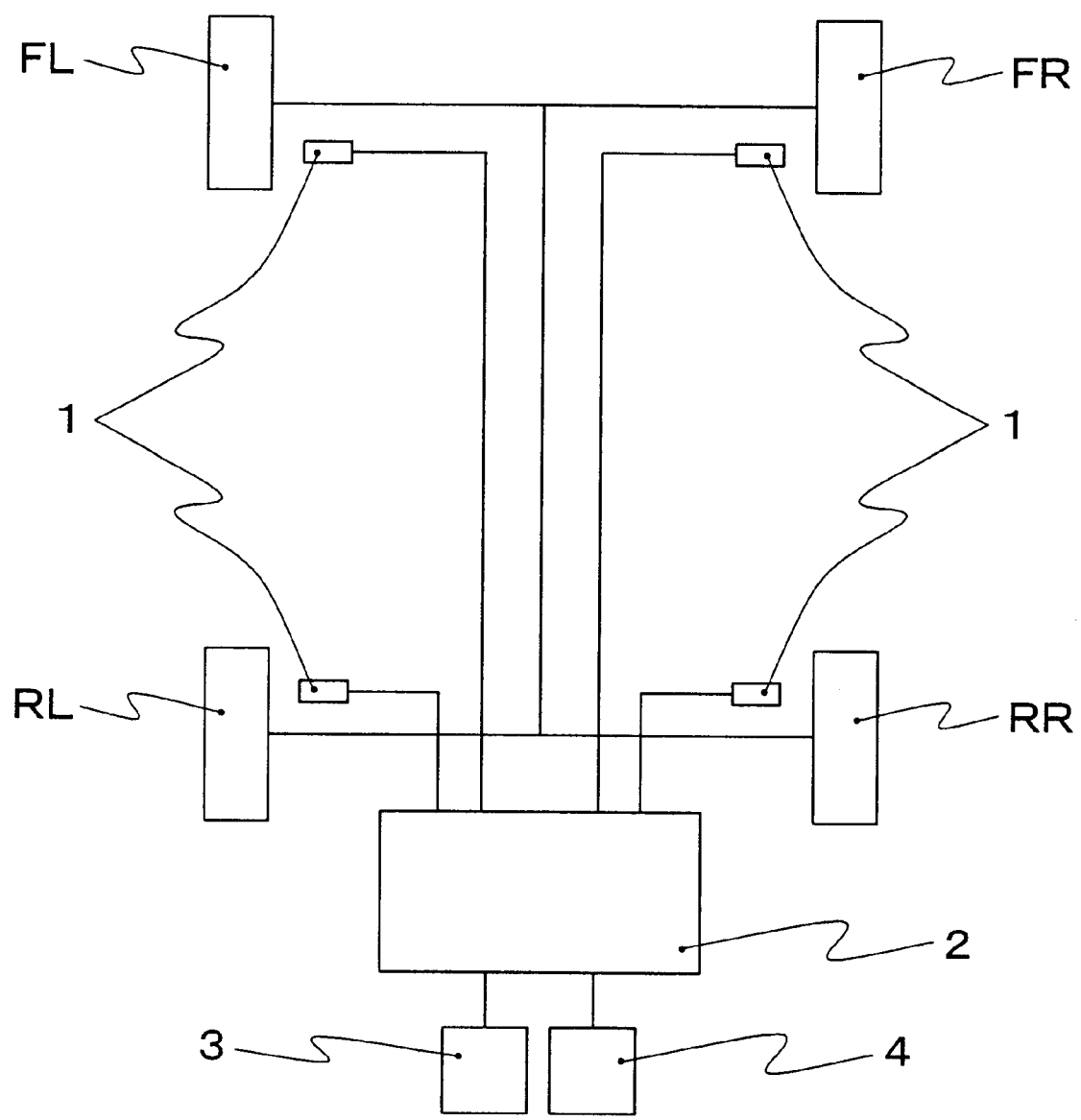
FIG. 1 is a block diagram illustrating an embodiment of an apparatus for alarming decrease in tire air-pressure according to the present invention.

As shown in FIG. 1, the apparatus for alarming decrease in air-pressure is so designed as to detect whether or not pneumatic pressure of four tires FL, FR, RL and RR (front left tire, front right tire, rear left tire, and rear right tire) attached to a four-wheeled vehicle has decreased, and is provided with ordinary wheel speed sensors 1 respectively arranged in connection with each of the tires FL, FR, RL and RR. The wheel speed sensor 1 detects rotational information of the respective tires such as number of revolution, rotational velocity or angular velocity. Outputs of the wheel speed sensor 1 are supplied to a control unit 2. To the control unit 2, there are connected a display device 3 constituted by a liquid crystal display element, a plasma display element, or a CRT for informing of the tires FL, FR, RL and RR (W1 to W4) having a decreased pneumatic pressure, and an initialization switch 4 capable of being operated by a driver.

Figure 2:
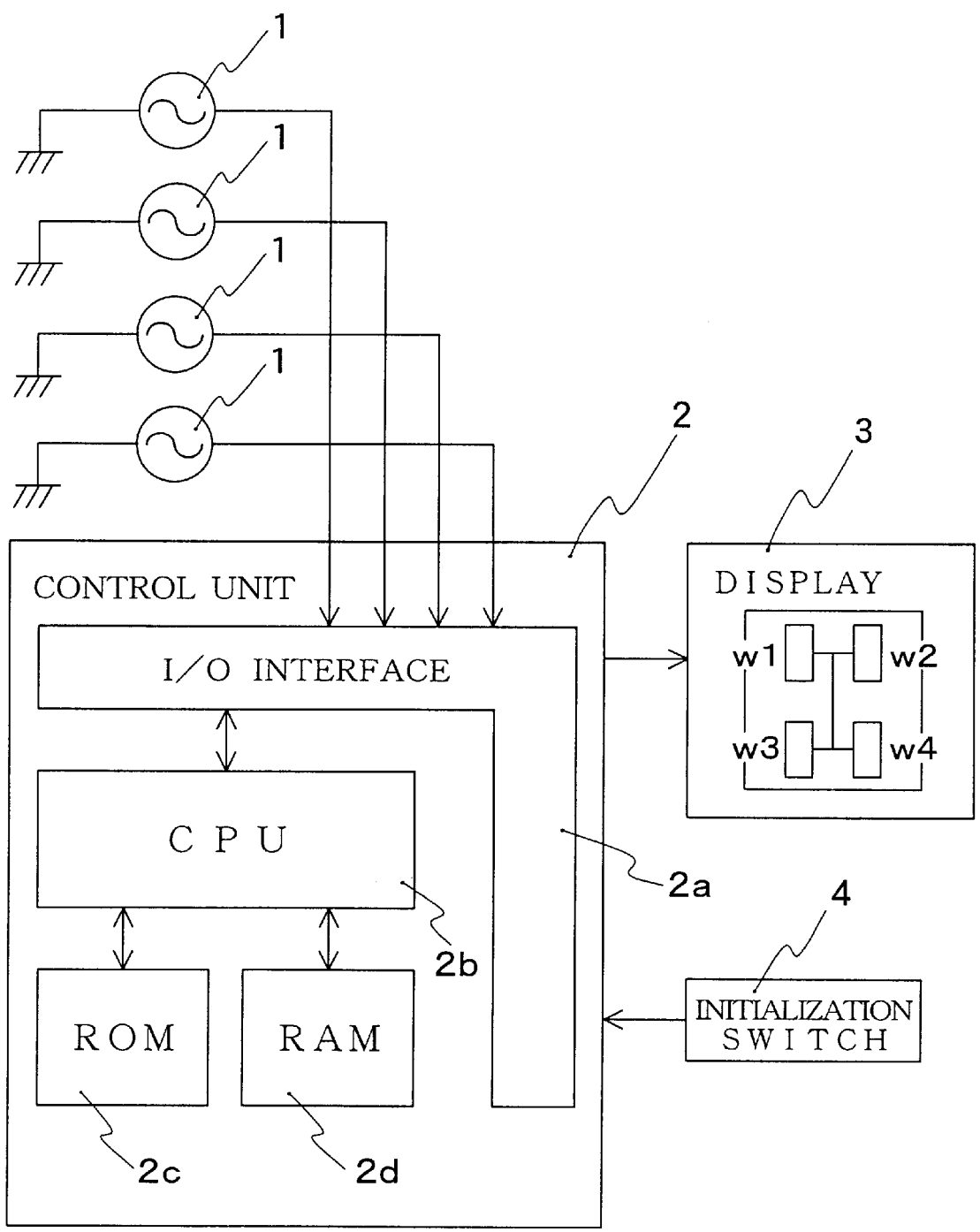
FIG. 2 is a block diagram illustrating electric arrangements of the apparatus for alarming decrease in tire air-pressure of FIG. 1.

As illustrated in FIG. 2, the control unit 2 includes an I/O interface 2a required for sending/receiving signals to/from an external device, a CPU 2b functioning as a center of calculating process, a ROM 2c storing a control operation program of the CPU 2b, and a RAM 2d into which data is temporally written or the written date is read out at a time when the CPU 2b executes the control operation.

In the present embodiment, the wheel speed sensor 1 functions as the wheel speed information detecting means, and the control unit 2 includes the memory means, the calculating means and the judging means therein.

Among general tires, influences of centrifugal force onto tires will be increased when performing high-speed running especially with tires of soft tire structure. In addition to the original soft structure, occurrence of decompression will act to further decrease the lockup force of the tire so that the amount of outward deflection of the tire will increase owing to centrifugal force. This indicates the fact that a tire diameter is easily varied in accordance with the vehicle velocity and that the correlation between the vehicle velocity and the outer diameter of the tire will become higher in the presence of decompression.

In other words, in case a ratio between a value, which is a value obtained by subtracting a sum of wheel speeds of one pair of wheels located on one diagonal line from a sum of wheel speeds of the other pair of wheels located on the other diagonal line, and an average value of the two sums is set to be a judged value (DEL value), occurrence of decompression will increase the reliability of the amount of variation in the outer diameter of the tire on the velocity. It might thus be understood that the correlation between the DEL value and the vehicle velocity becomes remarkably high when performing high speed running with a tire in a decompressed condition.

The DEL value can be obtained by the following equation.

$$DEL = \frac{\frac{V_{(1)}+V_{(4)}}{2} - \frac{V_{(2)}+V_{(3)}}{2}}{\frac{V_{(1)}+V_{(2)}+V_{(3)}+V_{(4)}}{4}} \times 100 \quad (1)$$

Here, V(X) denotes a rotational velocity of a tire (m/sec), wherein x: 1=front left tire, 2=front right tire, 3=rear left tire, 4=rear right tire.

In case each of the tire air-pressures of the four wheels are substantially identical, influences on centrifugal force will similarly be substantially identical and accordingly be cancelled so that the DEL value will be hardly affected.

The present embodiment utilizes the phenomenon that the correlation between the vehicle velocity and the outer diameter of the tire becomes higher at the time of performing high-speed running since a decompressed tire is increasingly affected by centrifugal force generated at the time of rotation of the tire when compared to remaining tires of normal internal pressure, and calculates a correlation coefficient between the DEL value and the vehicle velocity at the time of performing high-speed running. When it is determined that the correlation coefficient has exceeded a preliminarily set threshold and that the correlation between the DEL value and the vehicle and the vehicle is remarkably high, it is determined that a tire is in a decompressed condition and the driver is accordingly alarmed.

For instance, when $x_i$ is set to the i-th vehicle velocity and $y_i$ is set to the i-th DEL value, the correlation r between the judged value and the vehicle velocity is obtained from the following equation (2).

$$r = \frac{S(xy)}{\sqrt{S(xx) \cdot S(yy)}} \quad (2)$$

Here, S(xx) and S(yy) indicate a sum of squares of deviation of variates x and y, respectively, and S(xy) indicates a sum of products of deviation of x and y. More particularly, $$S(xx) = \sum_{i=1}^{n}(x_i - \bar{x})^2 = \sum_{i=1}^{n} x_i^2 - \left(\sum_{i=1}^{n} x_i\right)^2 / n \quad (3)$$

$$S(yy) = \sum_{i=1}^{n}(y_i - \bar{y})^2 = \sum_{i=1}^{n} y_i^2 - \left(\sum_{i=1}^{n} y_i\right)^2 / n \quad (4)$$

$$S(xy) = \sum_{i=1}^{n}(x_i - \bar{x})(y_i - \bar{y}) = \sum_{i=1}^{n} x_i y_i - \left(\sum_{i=1}^{n} x_i\right)\left(\sum_{i=1}^{n} y_i\right) / n \quad (5)$$

Note that n is the number of data in which a pair of data of x and y is counted as one. A sample correlation coefficient r obtained from the above equation (2) is in the range of $$-1 \leq r \leq 1$$

Since the correlation coefficient r might generally be regarded as "remarkably high correlation" when the correlation coefficient exceeds 0.8, it is preferable to set the same in the range of 0.8 to 1 or −0.8 to −1.

EXAMPLE

While the present invention will now be explained based on an example thereof, the present invention is not to be limited by this example alone.

A vehicle equipped with tires of fuel-sparing design (tire size: 155/70R15) as the four wheels of a front-wheel driving vehicle (FF vehicle) was provided. The vehicle was then made to drive on Autobahn in Germany in a case in which the air-pressure for all of the four tires was set to be normal internal pressure (vehicle A) and in a case in which only the rear right tire was decompressed by 40% (vehicle B).

A sampling time for the wheel speeds was set to be 1 second. A measuring time for the running was set to be 10 minutes.

The vehicle B was made to run at a vehicle velocity V of not more than 100 km/h and at an average vehicle velocity of 151 km/h (minimum velocity 90 km/h to maximum velocity 190 km/h).

Decrease in tire air-pressure was determined based on the correlation between the judged value (DEL value) and the vehicle velocity V during running of the above vehicle A and vehicle B (Example), and determination of decompression was further performed in accordance with conventional methods in which an average of judged values (DEL values) is obtained (Comparative Example). The results are illustrated in Table 1. The threshold for issuing alarm in Example was set to be −0.8 to −1 or 0.8 to 1. The threshold for issuing alarm in the Comparative Example was set to be 0.15.

TABLE 1

| Conditions for Running | Average DEL value according to conventional method (Comparative Example) | Alarm issued? | Correlation coefficient between DEL value and V (Example) | Alarm issued? |
|---|---|---|---|---|
| All four tires at normal internal pressure | −0.008 | NO | 0.53 | NO |
| Rear right tire decompressed by 40% (not more than 100 km/h) | 0.21 | YES | 0.30 | NO |

TABLE 1-continued

| Conditions for Running | Average DEL value according to conventional method (Comparative Example) | Alarm issued? | Correlation coefficient between DEL value and V (Example) | Alarm issued? |
|---|---|---|---|---|
| Rear right tire decompressed by 40% (90 to 190 km/h, average 150 km/h) | 0.14 | NO | −0.85 | YES |

It can be understood from Table 1 that while decompression can be detected in Comparative Example in a velocity region of not more than 100 km/h, it is impossible to detect decompression in a high-speed region ranging from 90 km/h to 190 km/h. On the other hand, while decompression cannot be detected in Example in a velocity region of not more than 100 km/h, it is possible to detect decompression in a high-speed region ranging from 90 km/h to 190 km/h. Thus, it can be understood that the performance of detecting decompression can be improved by concurrently using both methods for detection.

As explained so far, according to the present invention, it is possible to determine a decompression of a tire based on the correlation between the judged value and the vehicle velocity also in case the judged value will not become large owing to increased influence of centrifugal force during high-speed running even though a tire is in a decompressed condition. Thus, by performing determination upon combining a conventional method and the present invention, it is possible to determine a decompression of a tire in both, high-speed regions and low-speed regions.

What is claimed is:

1. An apparatus for alarming decrease in tire air-pressure which detects the decrease in internal pressure of the tire based on wheel speed information obtained from wheels of a vehicle and accordingly alarms a driver, comprising: a wheel speed information detecting means for detecting wheel speed information of the respective tires, a memory means for storing the wheel speed information of the respective tires, a calculating means for calculating a judged value based on a vehicle velocity and wheel speed information of the respective tires, and a judging means for determining a decrease in tire air-pressure based on correlation of the vehicle velocity and an outer diameter of the tire at the time of performing high-speed running.

2. The apparatus of claim 1, wherein, in case there is correlation between an outer diameter of the tire and a wheel speed of a wheel of the tire, the judging means obtains a judged value for judging decompression which is a ratio between a value obtained by subtracting a sum of wheel speeds of one pair of wheels located on one diagonal line from a sum of wheel speeds of the other pair of wheels located on the other diagonal line, and an average value of the two sums; and determines the decrease of tire air-pressure based on correlation between the judged value and a vehicle velocity at a high speed running.

3. The apparatus of claim 2, wherein correlation coefficient in the correlation between the judged value and the vehicle velocity is in the range of 0.8 to 1 or −0.8 to −1.

4. A method for alarming decrease in tire air-pressure which detects the decrease in internal pressure of the tire based on wheel speed information obtained from wheels of a vehicle and accordingly alarms a driver, comprising the steps of: detecting wheel speed information of the respective tires, storing the wheel speed information of the respective tires, calculating a judged value based on a vehicle velocity and wheel speed information of the respective tires, and determining a decrease in tire air-pressure based on correlation of the vehicle velocity and an outer diameter of the tire at the time of performing high-speed running.

5. The method of claim 4, wherein the decrease in tire air-pressure is judged by obtaining a judged value for judging decompression which is a ratio between a value obtained by subtracting a sum of wheel speeds of one pair of wheels located on one diagonal line from a sum of wheel speeds of the other pair of wheels located on the other diagonal line, and an average value of the two sums; and determining the decrease of tire air-pressure based on correlation between the judged value and a vehicle velocity at a high speed running.

6. The method of claim 5, wherein correlation coefficient in the correlation between the judged value and the vehicle velocity is in the range of 0.8 to 1 or −0.8 to −1.

* * * * *